US010943496B2

United States Patent
Reed et al.

(10) Patent No.: US 10,943,496 B2
(45) Date of Patent: *Mar. 9, 2021

(54) DYNAMIC EDUCATIONAL SYSTEM INCORPORATING PHYSICAL MOVEMENT WITH EDUCATIONAL CONTENT

(71) Applicant: ActivEd, Inc., Greenville, SC (US)

(72) Inventors: Julian A. Reed, Greenville, SC (US); Matt Ferebee, Greenville, SC (US); Brewster Crosby, Portland, OR (US); Jennifer Weaver-Spencer, Charlotte, NC (US)

(73) Assignee: ActivEd, Inc., Greenville, SC (US)

( * ) Notice: Subject to any disclaimer, the term of this patent is extended or adjusted under 35 U.S.C. 154(b) by 168 days.

This patent is subject to a terminal disclaimer.

(21) Appl. No.: 16/215,665

(22) Filed: Dec. 11, 2018

(65) Prior Publication Data

US 2019/0164443 A1 May 30, 2019

Related U.S. Application Data

(63) Continuation of application No. 15/016,697, filed on Feb. 5, 2016, now Pat. No. 10,186,162.

(60) Provisional application No. 62/112,715, filed on Feb. 6, 2015.

(51) Int. Cl.
*G09B 5/06* (2006.01)
*G09B 7/02* (2006.01)
*G09B 19/00* (2006.01)
*G09B 5/02* (2006.01)

(52) U.S. Cl.
CPC .............. *G09B 5/06* (2013.01); *G09B 5/02* (2013.01); *G09B 7/02* (2013.01); *G09B 19/00* (2013.01); *G09B 19/0038* (2013.01)

(58) Field of Classification Search
CPC .......... G09B 5/06; G09B 5/065; G09B 5/067; G09B 7/02; G09B 7/04; G09B 7/06; G09B 19/00
USPC ....... 434/247, 258, 308, 309, 322, 324, 327, 434/350, 353–362, 365; 706/927
See application file for complete search history.

(56) References Cited

U.S. PATENT DOCUMENTS

| | | | |
|---|---|---|---|
| 5,302,132 A * | 4/1994 | Corder | G09B 5/14 345/173 |
| 6,850,652 B1 * | 2/2005 | Thomas | G09B 21/00 235/462.47 |
| 8,021,160 B2 * | 9/2011 | Chang | G09B 5/00 434/262 |
| 8,500,453 B2 | 8/2013 | Simon | |

(Continued)

*Primary Examiner* — Milap Shah
(74) *Attorney, Agent, or Firm* — Kim and Lahey Law Firm LLC; Douglas W. Kim

(57) ABSTRACT

This invention is a computer-implemented system or method for creating and delivering content for kinesthetic learning comprising: lesson criteria; an action block; an instruction block; a first lesson block; a second lesson block having kinesthetic content; and a summary block. A real-time digital assessment form can be provided to the user for recording student performance in response to displaying the action block, instruction block, first lesson block, second lesson block and summary block to multiple students simultaneously. The filled real-time assessment form can be transmitted electronically to a parent, guardian or other caretaker of the student. A physical worksheet can be provided to the student having content consistent with the lesson criteria.

20 Claims, 7 Drawing Sheets

(56) References Cited

U.S. PATENT DOCUMENTS

| | | | |
|---|---|---|---|
| 9,542,853 B1* | 1/2017 | Bergeron | G09B 23/30 |
| 10,186,162 B2* | 1/2019 | Reed | G09B 19/00 |
| 2001/0031456 A1* | 10/2001 | Cynaumon | G09B 7/02 |
| | | | 434/350 |
| 2002/0143873 A1* | 10/2002 | Lamp | G09B 5/02 |
| | | | 709/204 |
| 2003/0077556 A1* | 4/2003 | French | A63B 69/0053 |
| | | | 434/258 |
| 2003/0198936 A1* | 10/2003 | Wen | G09B 7/00 |
| | | | 434/351 |
| 2004/0009462 A1* | 1/2004 | McElwrath | G09B 7/02 |
| | | | 434/350 |
| 2005/0186550 A1* | 8/2005 | Gillani | G09B 7/02 |
| | | | 434/322 |
| 2005/0287510 A1 | 12/2005 | Sumrall et al. | |
| 2007/0148624 A1* | 6/2007 | Nativ | A63B 24/0003 |
| | | | 434/258 |
| 2007/0202484 A1* | 8/2007 | Toombs | G09B 7/00 |
| | | | 434/350 |
| 2008/0254434 A1* | 10/2008 | Calvert | G09B 7/00 |
| | | | 434/350 |
| 2009/0098524 A1* | 4/2009 | Walton | G09B 5/14 |
| | | | 434/350 |
| 2009/0300551 A1* | 12/2009 | French | G09B 19/003 |
| | | | 715/848 |
| 2009/0325133 A1 | 12/2009 | Guill | |
| 2010/0255455 A1* | 10/2010 | Velozo | G09B 7/00 |
| | | | 434/362 |
| 2012/0094265 A1* | 4/2012 | Boler | G09B 7/00 |
| | | | 434/362 |
| 2012/0329026 A1* | 12/2012 | Lewolt | G09B 5/00 |
| | | | 434/322 |
| 2013/0089852 A1 | 4/2013 | Kuntz | |
| 2014/0123067 A1* | 5/2014 | Sokolsky | G09B 7/08 |
| | | | 715/835 |
| 2014/0193795 A1* | 7/2014 | Tavolacci | G09B 7/02 |
| | | | 434/362 |
| 2014/0272912 A1* | 9/2014 | Rozycki | G09B 5/08 |
| | | | 434/362 |
| 2014/0287397 A1* | 9/2014 | Chong | G09B 5/12 |
| | | | 434/350 |
| 2016/0049089 A1* | 2/2016 | Witt | G06K 9/00342 |
| | | | 434/258 |
| 2016/0314709 A1* | 10/2016 | Matthews | G09B 23/02 |
| 2017/0116875 A1* | 4/2017 | McGuire | G09B 17/00 |

* cited by examiner

Name _____          Making Groups of 10

Find the frame that has 10 objects. Circle it. Draw more objects in each frame to make a group of 10.

DYNAMIC EDUCATIONAL SYSTEM INCORPORATING PHYSICAL MOVEMENT WITH EDUCATIONAL CONTENT

CLAIM OF PRIORITY

This application is a continuation application from U.S. patent application Ser. No. 15/016,697 filed Feb. 5, 2016 which in turn claims priority on U.S. Provisional Patent Application 62/112,715 filed Feb. 6, 2015, both of which are incorporated by reference.

BACKGROUND OF THE INVENTION

1) Field of the Invention

The present invention relates to a system for providing educational content based upon teaching and content standards, and associating the content with visual and audio instructions to combine the content with physical activity.

2) Description of Related Art

In the educational professions, there has been a variety of research directed to student motivation for learning and how students process information. One type of learning style has been described as kinesthetic learning and is directed to having the student carrying out a physical activity, rather than listening to a lecture or watching a demonstration. According to learning theory, students who have a predominantly kinesthetic style of learning are believed to "discovery learners"; that is they have realization through doing, rather than thinking before initiating action. These students may struggle to learn by reading or listening. In an elementary classroom setting, these students may stand out because of their need to move; their high energy levels may cause them to be agitated, restless, or impatient. Kinesthetic learners' short and long-term memories are strengthened by their use of movement.

Another learning style has been described as visual learning and is a style where ideas, concepts, and other information are associated with images. The auditory learning style is where the student learns through listening. Auditory learners must be able to hear what is being said in order to understand, and may have difficulty with instructions that are visual. Writings that are in logical order can be easier to understand. There is also the reading style of learning where the student is able to learn from the content of a writing.

When providing educational instruction, especially at the elementary school level, using a delivery format that contemplates each of the different learning styles would be advantageous. One attempt to provide such a learning method is shown in United States Patent Application Publication 2013/0089852 which includes "activity mats [that] allow students to physically move as they learn the relationships of abstract concepts, thus using more learning modalities (visual, auditory, motor, and kinesthetic) when practicing". Further, United States Patent Application Publication 2009/0325133 discloses mats that can be arranged in sequential order to form a navigable path. The path is repeatedly traversed by the student. As the student becomes knowledgeable about the sequence, the path is arranged such that traversal is more difficult. The path includes test points for evaluating the student's knowledge of the sequence. The disadvantage of this technology is that is can only be used by one student at a time in a linear fashion. The same disadvantage exists for the technology described in U.S. Pat. No. 8,500,453 which requires a punching bag or floor mat.

One issue with learning systems, particularly automated systems, is that students can recognize and memorize patterns in the system without necessarily learning the content. This effect results in the students' responding to the patterns and not necessarily the content being presented.

Accordingly, it is an object of the present invention to provide for an educational assistance platform incorporating educational content with physical activity instruction that can be used in the classrooms setting.

It is another object of the present invention to provide modulating content to prevent students from substituting pattern recognition for learning.

SUMMARY OF THE INVENTION

The above objectives are accomplished according to the present invention by providing a computerized system for presenting lesson content combined with student physical activity having a computer readable medium, having computer readable instructions in electronic communications with a remote server, having access to a plurality of databases that preform the steps of: receiving input from a teacher including grade, subject, standard, team and lesson name; retrieving general introduction, lesson specific information physical activity instructions, lesson content with activities, lesson summaries and a closing from the plurality of databases according to the input; creating a lesson having a general introduction, lesson specific information a first physical activity instruction, a first lesson content with activity, a second physical activity instruction, a second lesson content with activity, a lesson summary and a closing; and simultaneously displaying the lesson to a classroom.

The invention can be a computerized system for creating and delivering audio, textual and visual content with real-time assessments for kinesthetic learning comprising: receiving lesson criteria from an educator representing a grade level, a subject, a standard and a lesson label; selecting an action block from a set of action blocks according to the lesson criteria; selecting an instruction block according to the lesson criteria and action block having kinesthetic content block consistent with the action block; creating a first lesson block by appending a first lesson content block selected from a set of lesson content blocks according to the lesson criteria, to a first copy of the kinesthetic content block; creating a second lesson block by appending a second lesson content block selected from the set of lesson content blocks according to the lesson criteria to a second copy of the kinesthetic content block; creating a summary block according to the first lesson block and second lesson block; providing a real-time digital assessment form to the educator for recording student performance in response to displaying the action block, instruction block, first lesson block, second lesson block, and summary block to multiple students simultaneously; receiving real-time assessment information from the educator recorded on the real-time digital assessment form; transmitting the filled real-time assessment form electronically upon completion to a guardian of each student having assessment information; and, providing a physical worksheet to the student having content consistent with the lesson criteria.

The computerized system can include a first lesson block having visual and audio content according to the lesson criteria and the second lesson block includes visual content according to the lesson criteria and first lesson block. The lesson packet can be created by storing the instruction block, first lesson block, second lesson block, summary block and real-time assessment in a computer readable medium indexed by the lesson label. The first lesson block can include content for kinesthetic, visual, and auditory styles of learning. The second lesson block includes content for kinesthetic and visual styles of learning. The action block, instruction block, first lesson block, and second lesson block are less than 10 minutes in length.

The computerized system can include providing a real-time digital assessment form to the educator by transmitting the real-time digital assessment form to a predetermined digital addressee associated with the educator's log-in information.

The computerized system for creating and delivering audio, textual and visual content with real-time assessments for kinesthetic learning can include a server having a computer readable medium and in communications with a classroom computer; a set of server computer readable instructions stored on the computer readable medium configured to: receive lesson criteria from the classroom computer; select a set of action blocks according to the lesson criteria wherein each action block includes a kinesthetic content block consistent with the set of action blocks; select an instruction block according to the lesson criteria that is consistent with the set of action blocks; create a first lesson block by appending the instruction block to the set of action blocks; create a second lesson block from the action blocks; display the first lesson block and the second lesson block to multiple students on a multi-viewer display; and, provide a physical worksheet to the student having content consistent with the lesson criteria.

The classroom computer can be configured to display a real-time digital assessment form to the classroom computer for recording the student's performance in response to displaying the first lesson block and the second lesson block on the classroom computer; and, the set of server computer readable instructions is configured to receive real-time assessment information from the classroom computer according to the real-time digital assessment form.

The set of server computer readable instructions can be configured to transmit the real-time digital assessment form and each student's real-time assessment information electronically upon completion to a guardian of each student of the multiple students having assessment information. The first lesson block can include visual and audio content according to the lesson criteria and the second lesson block includes visual content according to the lesson criteria and the first lesson block. The set of server computer readable instructions can be configured to create a lesson packet by storing the first lesson block and the second lesson block and each student's real-time assessment information in the computer readable medium indexed by a lesson label. The lesson block can include content for kinesthetic, visual and auditory styles of learning. The set of action blocks, instruction block, first lesson block, and second lesson block can be less than 10 minutes in length.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
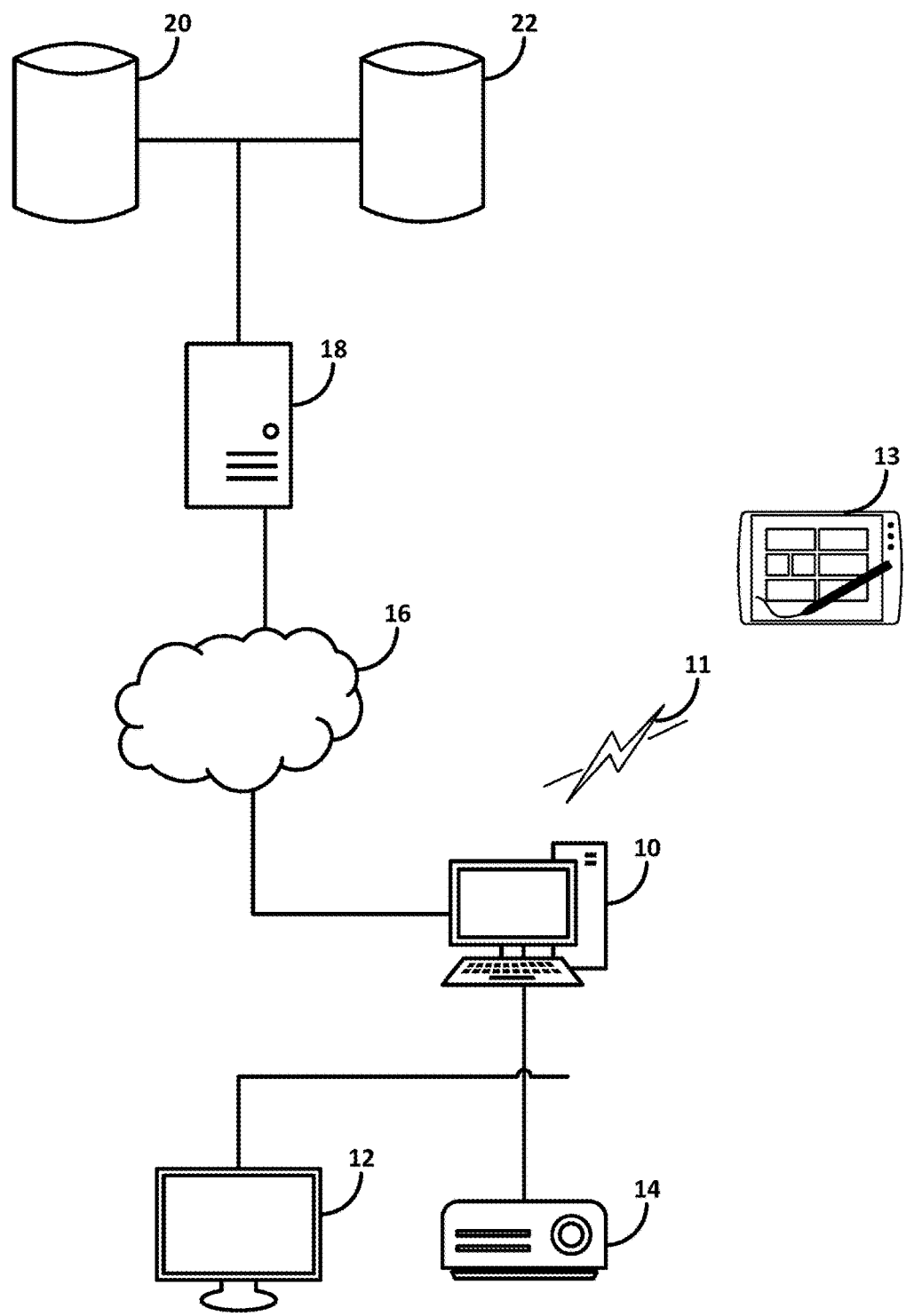
FIG. 1 is a schematic of the invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits, and advantages of the present invention will be apparent from this summary and certain embodiments described below, and will be readily apparent to those skilled in the art. Such objects, features, benefits, and advantages will be apparent from the above in conjunction with the accompanying examples, data, figures, and all reasonable inferences to be drawn therefrom, alone, or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Computer readable instructions, when executed by a computer processor, cause the computer to perform a series of steps to accomplish a specific task, resulting in useful, concrete, and tangible results, adding substantially more to the operation of a general computer. The computer instructions improve the functioning of the computer itself, providing a novel of performances in functionality described herein. This computer readable code is tied to a particular machine or apparatus with specific purpose of executing the computer readable code for accomplishing tangible results and represented and accomplishes the manipulation of physical data.

The detailed description that follows may be presented in terms of program procedures executed on a computer or network of computers. These procedural descriptions are representations used by those skilled in the art to most effectively convey the substance of their work to others skilled in the art. These procedures herein described are generally a self-consistent sequence of steps leading to a desired result, when executed by a computer and its processor, representing or resulting in the tangible manipulation of physical objects. These steps also require physical manipulations of physical quantities such as electrical or magnetic physical elements and are capable of being stored, transferred, combined, compared, or otherwise manipulated readable medium, that is designed to perform a specific task or tasks. Actual computer or executable code or computer readable code may not be contained within one file or one storage medium, but may span several computers or storage mediums. The term "host" and "server" may be hardware, software, or combination of hardware and software that provides the functionality described herein.

The present invention is described below with reference to flowchart illustrations of methods, apparatus ("systems"), and computer program products according to the invention. It will be understood that each block of a flowchart illustration can be implemented by a set of computer readable instructions or code. These flowcharts, with the written description, illustrate the improvement in the technology and technical field of this invention.

Elements of the flowchart support combinations of means for performing the special functions, combination of steps for performing the specified functions, and program instruction means for performing the specified functions. It will be understood that each block of the flowchart illustrations can be implemented by special purpose hardware-based computer systems that perform the specified functions, or steps, or combinations of special purpose hardware or computer instructions.

The present invention is now described more fully herein with reference to the drawings in which the preferred embodiment of the invention is shown. This invention may, however, be embodied in many different forms and should not be construed as limited to the embodiment set forth herein. Rather, these embodiments are provided so that this disclosure will be thorough and complete and will fully convey the scope of the invention to those skilled in the art.

Referring to FIG. 1, the invention will be described in more detail. A classroom computer 10 is connected to a multi-viewer display 12 or projector 14. The multi-viewer display or projector allows more than one student to view the content on the display at a time. The classroom computer need not be located in the classroom but can also be remotely located and accessed through a local area network, wide area network, or global communications network 16. In one embodiment, the classroom computer can access a remote server 18 through a network. The remote server can have access to various databases including educational content database 20 and physical instruction database 22. In this configuration, the teacher can create and project educational content with physical instructions to multiple students in the classroom simultaneously.

In one embodiment, the computerized system can include a wireless device 13 that is in wireless communications to the classroom computer 10 so that information such as the real time digital assessment form can be transmitted to the user for use on the wireless device allowing the user to roam the classroom while completing the form.

Figure 2:
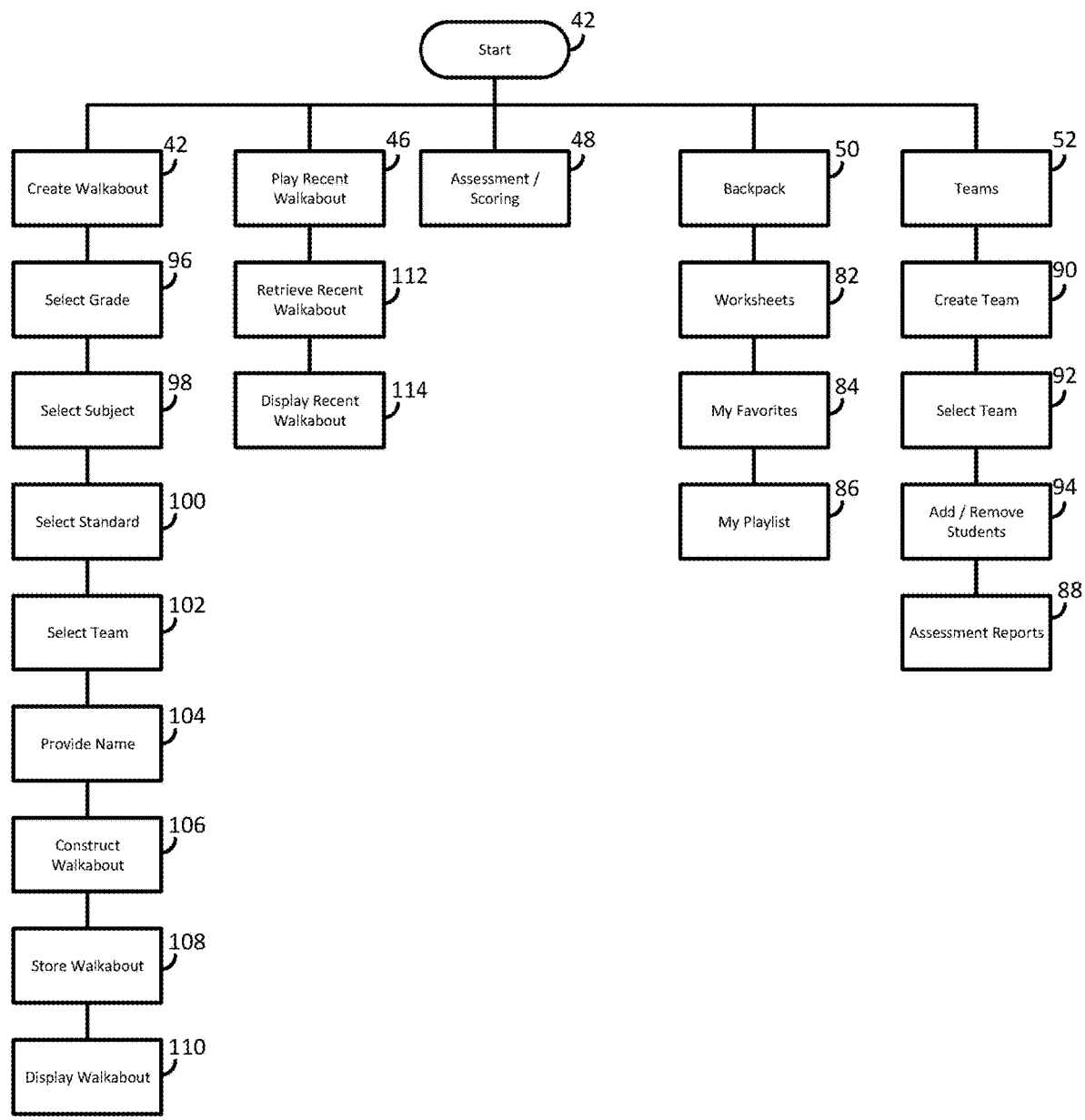
FIG. 2 is a diagram of the invention.

Referring to FIG. 2, the operation of the invention is described in further detail. The teacher starts the process as 42. When the teacher provides acceptable login credentials, the teacher is provided with the option to create a lesson at 44, play a previously created lesson at 46, perform assessments or scoring of the students based upon the interaction at 88, and behavior during the lesson at 48, manage the backpack at 50, or name teams and students at 52. The team can be created at 90, selected at 92, and students added or removed from the team at 94. Once created, the lesson can be retrieved at 112 and displayed at 114.

Referring to FIG. 2, the teacher can select the team option 52. Under this option, the system allows for the teacher to create teams and to add students to the teams. The teams can have students assigned to the teams and the teacher can add and subtract both teams and students. During the presentation of the lesson content, the teacher can evaluate the students and teams. In one embodiment, the evaluation includes the ability for the teacher to select from the options of whether the student or team (i) meets the standards selected by the teacher or (ii) needs improvements. The evaluation can be emailed to the parents of the students and notes can be added to the evaluation. In one embodiment, the teacher requests that an assessment be performed. In this embodiment, the invention provides the assessment to the teacher in the form of an email providing a link to the teacher to perform the assessment. Therefore, the assessment is sent only to the teacher and cannot be performed by anyone not authorized to receive the teacher's emails.

Figure 3:
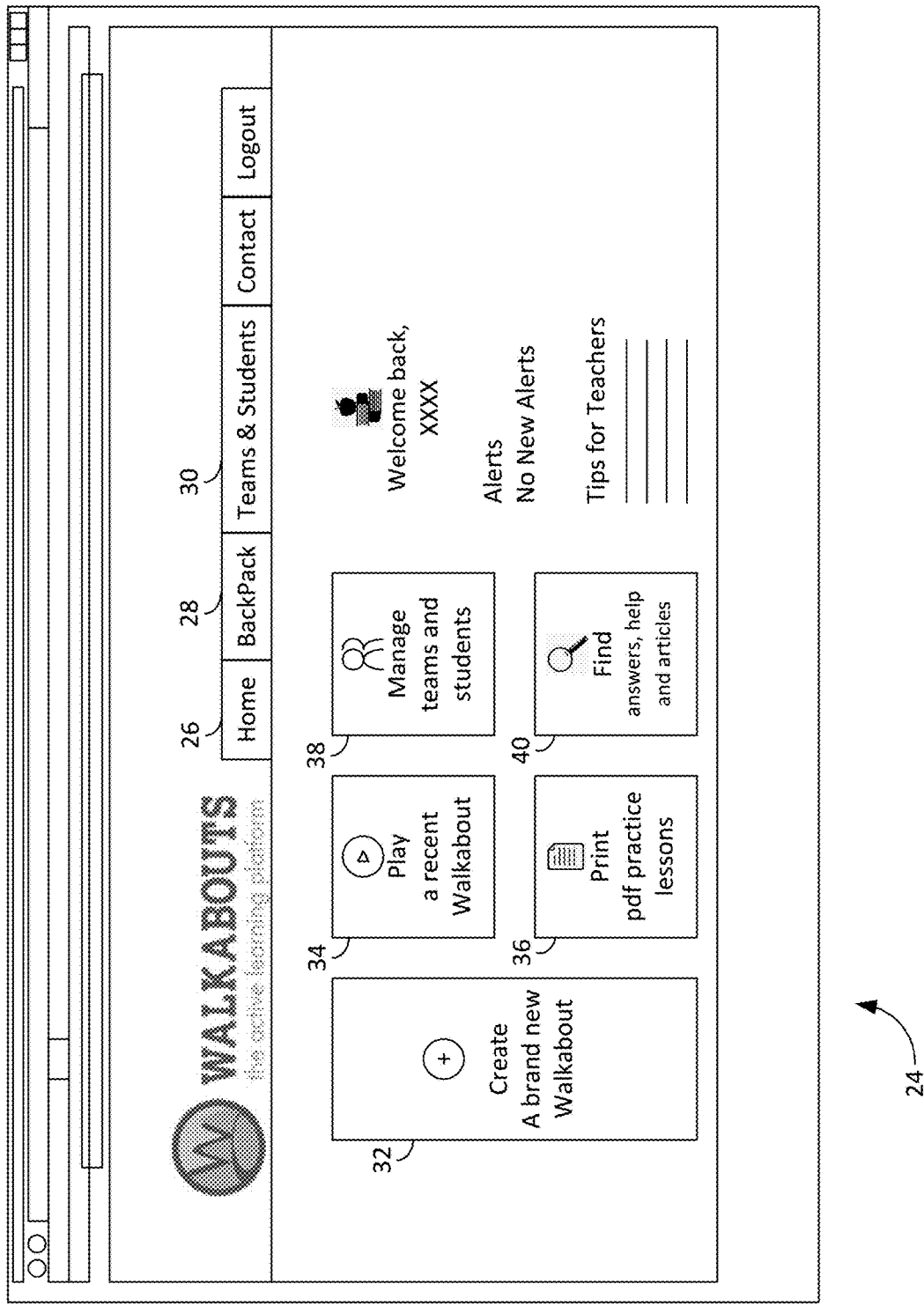
FIG. 3 is aspects of the user interface of the invention.

After logging on, the screen of FIG. 3 is presented to the teacher in one embodiment. The home screen, shown generally as 24, includes a menu having a home 26, backpack 28, and teams and student 30 options along the menu bar. A lesson is created by selecting the create option 32. Once the lesson is created, the lesson is stored and can be replayed with the Play option 34. Practice lessons can be printed in hard copy with the Print option 36. The teams and students options can be managed through selecting Manage 38. Information including answers to questions, articles and the like, can be access through the Find option 40.

When the teacher wishes to create a lesson, the computer readable instructions perform the following data transformations and improve the functionality of the computer system by integrating unlike parts into a cohesive presentation package. Further, the technology in the field of educational content presentation is improved given that the automated lesson that is generated, will be different standard based content.

In the creation of the lesson, the teacher selects the grade level at 96 (FIG. 2), subject at 98, standard at 100, and select a class or team at 102. The teacher can also name the lesson at 104 and save the lesson for replay. Once these selections are made, the computer readable instructions construct the lesson at 106, store the lesson at 108, and can display the lesson at 110.

The invention, a computer-implemented system and method, that allows for the dynamic creation of educational content that combines visual, audio and textual content for kinesthetic learning. In one embodiment, the user, an educator or student, can access the software with login information which can be tied to a unique identifier. The computer-implemented method can then receive input from the user that include a grade level, subject, standard, and lesson label. The user can create a new lesson packet by initially entering this lesson criteria. The lesson label can be free form text that can be used for identifying a created lesson packet for subsequent retrieval. The lesson packet can also be stored and transmitted to another computer system for use by other users.

In one embodiment, the grades are selected from the group consisting of Pre-Kindergarten, Kindergarten, First Grade, Second Grade, Third Grade, Fourth Grade, Fifth Grade, and Sixth Grade. The subjects are selected from the group of English/Language Arts/Literacy and Math. The standards can be selected from: For Pre-Kindergarten: PK.2.E.05 Writing; PK.2.E.06 Developing Phonological Awareness: Initial Phonemes and Rhyming Pairs; PK.2.E.06 Developing Phonological Awareness: Rhyming Words; PK.2.E.07 Recognizing and Writing Uppercase Letters A-J; PK.2.E.07 Recognizing and Writing Uppercase Letters K-T; PK.2.E.07 Recognizing and Writing Uppercase Letters U-Z; PK.2.E.07 Recognizing Lowercase Letters; PK.2.E.07 Recognizing Lowercase Letters and Matching to Uppercase Letters; PK.2.F.02 Understanding Numbers 1-10; PK.2.F.02 Understanding Numbers 1-20; PK.2.F.03 Categorizing by Attributes; PK.2.F.05 Units of Measurement: Bigger, Smaller, Taller; PK.2.F.06 Basic Concepts of Geometry: Shapes; PK.2.F.07 Time: Seasons and Days of the Week; PK.2.F.08 Repeating Patterns.

For Kindergarten Math: K.CC.1-2 Counting to 100, Counting by Tens, and Counting On; K.CC.3 Writing Numbers, Numbers to 20; K.CC.4a Pairing Numbers and Objects; K.CC.4b Numbers and Arrangements of Objects; K.CC.4c Counting One More Than a Given Number; K.CC.5 Counting to Tell How Many to 20; K.CC.6-7 Numbers and Objects: Greater Than, Less Than, and Equal To; K.OA.1 Addition and Subtraction Using Pictures and Actions; K.OA.2 Addition and Subtraction Word Problems; K.OA.3 Decomposing Numbers in Multiple Ways; K.OA.4 Number Combinations That Make 10; K.OA.5 Addition and Subtraction Within 5; K.NBT.1 Composing and Decomposing Numbers 11 to 19; K.MD.1-2 Describing and Comparing Attributes of Objects; K.MD.3 Classifying Objects; K.G.1 Describing Objects Using Positional Words; K.G.2 Naming Two-Dimensional and Three-Dimensional Shapes; K.G.3 Identifying Solid and Flat Shapes; K.G.4 Analyzing and Comparing Two-Dimensional and Three-Dimensional Shapes; K.G.5 Modeling and Building Shapes; K.G.6 Using Simple Shapes to Form Larger Shapes.

For Kindergarten English and Language Arts: K.RL.1 Questions About Key Details; K.RL.2 Retelling Familiar Stories; K.RL.3 Identifying Parts of Stories; K.RL.4 Questions About Unknown Words in Literature; K.RL.5 Recognizing Common Types of Texts; K.RL.6 Roles of Authors and Illustrators in Literature; K.RL.7 Relationships Between Illustrations and Text; K.RI.1 Questions About Key Details in Informational Text; K.RI.2 Retelling Topics and Key Details in Informational Text; K.RI.3 Describing Connections Within Informational Text; K.RI.4 Questions About Unknown Words in Informational Text; K.RI.5 Identifying Parts of an Informational Text; K.RI.6 Roles of Authors and Illustrators in Informational Text; K.RI.7 Relationships Between Illustrations and Informational Text; K.RF.1a-1c Basic Features of Print; K.RF.1d Naming Uppercase and Lowercase Letters; K.RF.2a Rhyming Words; K.RF.2b Syllables in Spoken Words; K.RF.2c Onsets and Rhymes in Spoken Words; K.RF.2d Phonemes in Spoken Words; K.RF.2e Substituting Phonemes in Spoken Words; K.RF.3a Consonant Sounds; K.RF.3b Long and Short Vowel Sounds; K.RF.3c Recognizing and Reading High Frequency Words; K.RF.3d Identifying Similarly Spelled Words; K.L.1a Printing Uppercase Letters; K.L.1a Printing Lowercase Letters; K.L.1b Using Nouns and Verbs; K.L.1c Forming Plurals; K.L.1d Using Question Words; K.L.1e Using Prepositions; K.L.2a Capitalizing Words in Sentences; K.L.2b Recognizing and Naming Ending Punctuation; K.L.2c Writing Letters for Consonants and Short Vowel Sounds; K.L.2d Spelling Words Phonetically; K.L.4a Identifying New Meanings of Familiar Words; K.L.4b Using Inflections and Affixes; K.L.5a Categorizing Objects; K.L.5b Antonyms; K.L.5c Connections Between Words and Their Uses; K.L.5d Distinguishing Shades of Meaning in Verbs.

For First Grade Math: 1.OA.1 Addition and Subtraction Word Problems Within 20; 1.OA.2 Addition Word Problems with Three Numbers and Sums to 20; 1.OA.3 Properties of Operations for Addition and Subtraction; 1.OA.4 Subtraction as Unknown-Addend Problems; 1.OA.5 Relating Counting to Addition and Subtraction; 1.OA.6 Strategies for Addition and Subtraction Within 20; 1.OA.7 Meaning of Equal Sign and True or False Equations; 1.OA.8 Determining Unknown Numbers in Equations; 1.NBT.1 Counting to 120 and Representing Objects as Numerals; 1.NBT.2a Understanding 10 as Bundles of Ten Ones; 1.NBT.2b Numbers from 11 to 19 as a Ten and Ones; 1.NBT.2c 10 to 100 as Groups of Tens; 1.NBT.3 Comparing Two-Digit Numbers with Symbols; 1.NBT.4 Adding One-Digit and Two-Digit Numbers Within 100; 1.NBT.5 Mentally Finding 10 More or 10 Less; 1.NBT.6 Subtracting Multiples of 10 from Multiples of 10; 1.MD.1 Ordering and Comparing Objects by Length; 1.MD.2 Expressing the Length of an Object; 1.MD.3 Telling Time to Hour and Half-Hour; 1.MD.4 Understanding Data with up to Three Categories; 1.G.1 Attributes of Shapes; 1.G.2 Composing Composite Shapes; 1.G.3 Dividing Circles and Rectangles into Halves and Quarters.

For First Grade English and Language Arts: 1.RL.1 Questions About Key Details; 1.RL.2-3 Retelling Stories and Describing Characters, Settings, and Events Using Key Details; 1.RL.4 Identifying Words and Phrases that Suggest Feelings or Appeal to Senses; 1.RL.5 Explaining Differences Between Stories and Informational Text; 1.RL.7 Using Illustrations and Details in Stories to Describe Characters, Settings, and Events; 1.RI.1 Questions About Key Details in Informational Text; 1.RI.2 Identifying Main Topics and Key Details in Informational Text; 1.RI.3 Describing Connections Within Informational Text; 1.RI.4 Questions About Unknown Words or Phrases in Informational Text; 1.RI.5 Using Text Features to Locate Information; 1.RI.6 Distinguishing Between Information from Words Versus Illustrations in Informational Text; 1.RI.7 Using Illustrations and Details to Describe Key Ideas in Informational Text; 1.RF.1a Sentence Features; 1.RF.2a Long and Short Vowel Sounds; 1.RF.2b Blending Sounds in Spoken Words; 1.RF.2c-d Segmenting Spoken Words into Initial, Medial, and Final Sounds; 1.RF.3a Spelling-Sound Correspondence for Consonant Digraphs; 1.RF.3b Decoding One-Syllable Words; 1.RF.3c Final "e" and Common Vowel Teams for Long Vowels; 1.RF.3d Vowels in Syllables; 1.RF.3e Decoding Two-Syllable Words; 1.RF.3f Reading Words with Inflectional Endings; 1.RF.3g Recognizing and Reading Irregularly Spelled Words; 1.L.1a Printing Uppercase Letters; 1.L.1a Printing Lowercase Letters; 1.L.1b Using Common, Proper, and Possessive Nouns; 1.L.1c Using Singular and Plural Nouns with Matching Verbs; 1.L.1d Using Personal, Possessive, and Indefinite Pronouns; 1.L.1e Using Verbs to Convey Past, Present, and Future; 1.L.1f Using Adjectives; 1.L.1g Using Conjunctions; 1.L.1h Using Determiners; 1.L.1i Using Prepositions; 1.L.1j Simple and Compound Declarative, Interrogative, Imperative, and Exclamatory Sentences; 1.L.2a Capitalizing Dates and Names; 1.L.2b Using Ending Punctuation; 1.L.2c Using Commas in Dates and Lists; 1.L.2d Using Conventional Spelling; 1.L.2e Using Phonetic Spelling for Uncommon Words; 1.L.4a Using Context Clues to Determine Meaning Within Sentences; 1.L.4b Using Affixes as Clues to Word Meaning; 1.L.4c Identifying Root Words and Their Inflectional Forms;

1.L.5a Categorizing Words; 1.L.5b Defining Words by Category and Key Attributes; 1.L.5c Connections Between Words and Their Uses; 1.L.5d Distinguishing Shades of Meaning in Verbs and Adjectives.

For Second Grade Math: 2.OA.1 Addition and Subtraction Multi-Step Word Problems Within 100; 2.OA.2 Mental Strategies for Addition and Subtraction Within 20; 2.OA.3 Odd and Even Numbers to 20; 2.OA.4 Using Addition to Find Totals in 5×5 Rectangular Arrays; 2.NBT.1a Understanding Hundreds as Bundles of Ten Tens; 2.NBT.1b 100 to 900 as Groups of Hundreds; 2.NBT.2 Counting Within 1000; Skip Counting by 5 s, 10 s, and 100 s; 2.NBT.3 Reading and Writing Numbers to 1000 Using Base-Ten, Number Names, and Expanded Form; 2.NBT.4 Comparing Three-Digit Numbers Using Symbols; 2.NBT.5 Fluent Addition and Subtraction Within 100 Using Multiple Strategies; 2.NBT.6 Addition of up to Four Two-Digit Numbers Using Place Value and Operations; 2.NBT.7 Addition and Subtraction Within 1000 Using Multiple Strategies; 2.NBT.8 Mental Addition and Subtraction of 10 or 100 to a Number 100-900; 2.MD.1 Measuring Lengths Using Tools; 2.MD.2 Measuring and Comparing Lengths Using Different Units; 2.MD.3 Estimating Standard Lengths; 2.MD.4 Measuring and Comparing Lengths of Standard Units; 2.MD.5 Addition and Subtraction Word Problems Within 100 Involving Lengths; 2.MD.6 Representing Whole Numbers on a Number Line; 2.MD.7 Time (Using a.m. and p.m.) to the Nearest 5 Minutes; 2.MD.8 Solving Word Problems with Money; 2.MD.9 Measuring Length and Making Line Plots; 2.MD.10 Picture and Bar Graphs; 2.G.1 Identifying and Drawing Shapes with Specified Attributes; 2.G.2 Dividing Rectangles into Equals Rows and Columns; 2.G.3 Dividing Circles and Rectangles into Halves, Quarters, and Thirds.

For Second Grade English and Language Arts: 2.RL.1 Questions that Show Understanding of Literature; 2.RL.3 Describing How Characters Respond to Major Events and Challenges; 2.RL.4 Describing How Words and Phrases Provide Rhythm and Meaning; 2.RL.5 Describe Story Structure (Beginning/Middle/End); 2.RL.7 Using Information from Illustrations and Words to Show Understanding of Characters, Settings, and Events; 2.RI.1 Questions that Show Understanding of Informational Text; 2.RI.2 Identifying Main Topics and Paragraph Focus in Informational Text; 2.RI.3 Describing Connections Within Informational Text; 2.RI.4 Determining Meaning in Informational Text; 2.RI.5 Using Text Features to Locate Information; 2.RI.7 Using Images for Clarification in Informational Text; 2.RF.3a Distinguishing Long and Short Vowels While Reading; 2.RF.3b Spelling-Sound Correspondence for Common Vowel Teams; 2.RF.3c Decoding Two-Syllable Words with Long Vowels; 2.RF.3d Decoding Words with Common Prefixes and Suffixes; 2.RF.3e Identifying Words with Inconsistent but Common Spelling-Sound Correspondence; 2.RF.3f Reading Irregularly Spelled Words; 2.L.1a Using Collective Nouns; 2.L.1b Using Irregular Plural Nouns; 2.L.1c Using Reflexive Pronouns; 2.L.1d Using Past Tense and Irregular Verbs; 2.L.1e Using Adjectives and Adverbs; 2.L.1f Working with Simple and Compound Sentences; 2.L.2a Capitalizing Holidays, Product Names, and Geographic Names; 2.L.2b Using Commas in Greetings and Closings of Letters; 2.L.2c Using Apostrophes in Contractions and Possessives; 2.L.2d Generalizing Spelling Patterns When Writing; 2.L.3a Comparing Formal and Informal Uses of English; 2.L.4a Using Context Clues to Determine Meaning Within Sentences; 2.L.4b Using Prefixes to Determine Meaning; 2.L.4c Using Root Words to Determine Meaning; 2.L.4d Using Prior Knowledge to Predict Compound Word Meanings; 2.L.5a Identifying Real-Life Connections Between Words and Their Uses; 2.L.5b Distinguishing Shades of Meaning in Verbs and Adjectives.

Figure 7:
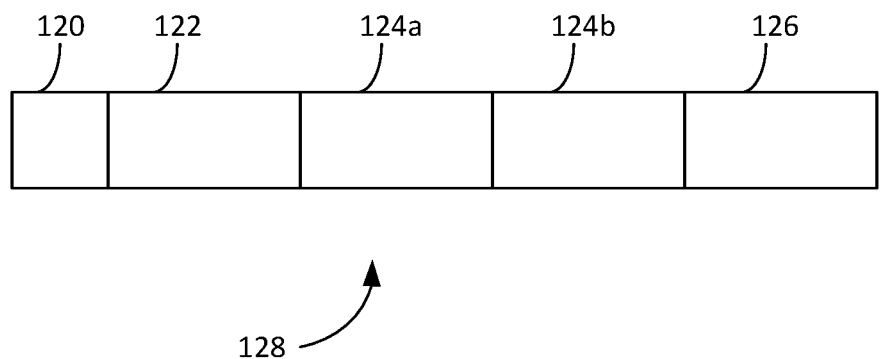

When creating a lesson packet (FIG. 7), the computer-implemented method can select an action block 122 from a set of action blocks. In one embodiment, the action block can be selected randomly. An action block is computer readable instructions that are associated with a particular physical movement. For example, the action block can be a displayed avatar that jumps and explains the action, with visual and audio information, to an audiences, such as students, simultaneously. The particular action block selected can be dependent upon the lesson criteria. For example, if the grade is pre-kindergarten, the physical activity associated with the action block would be less advanced and more age appropriate.

The computer-implemented method can then select an instruction block 124 based upon the lesson criteria from a set of instruction blocks. Each instruction block in the set of instruction blocks can include kinesthetic content that associated a physical movement with a response to a question. For example, the instruction block could include instructions to show the audience to pick up a block and place it in a stack for the number of block to be counted. The picking up of blocks would be a physical activity appropriate for the particular lesson of counting blocks. The lesson criteria could determine the instruction block selected and the kinesthetic content in the instruction block.

When selecting the instruction block from the set of instruction blocks, the set of instruction blocks can be filtered according to the lesson criteria and action block. For example, if the lesson criteria is for pre-kindergarten, the set of instruction blocks would be filter to remove blocks containing physical movements that would be too advanced for the selected grade. For example, a second-grade student could be able to accomplish skipping and galloping while these activities may be too advanced for the pre-kindergarten student.

The computer-implemented method can also create a first lesson block 124a according to the lesson criteria. For example, a lesson block can display ten blocks to the audience. The kinesthetic content could instruct the audience to reach down to the right, pick up a block, and place is on a stack at the left. While there would be no physical blocks for the audience, the motion would mimic placing block in a stack. The student would move ten times to represent the counting of ten blocks. The visual representation of the blocks being stacked can be included in the instruction block and displayed to associated the physical activity with the educational content. The displayed content can show blocks being stacked. As the audience counts the block, the physical motion reinforces the lesson of learning to count. The kinesthetic content can be a copy from the instruction block. A second lesson block 124b can also be created. In one embodiment, the second lesson block would include the same content at the first lesson block, but the audio content may be missing so that the audience would need to perform the physical activity according to the second lesson block without audio aids or prompts.

A summary block 126 can be created to include audio and visual content explaining the general principal communicated in the first and second lesson blocks. The action block, instruction block, first and second lesson block and summary block can be appended to display linearly to form a lesson packet 128 that can be physically arranged in linear order. The lesson packet can be stored for subsequent retrieval. The lesson packet can be identified with a label 120.

The computer-implemented method provides real-time assessment form allowing the user to provide instant feedback directed to the performance of the audience while viewing a lesson packet. For example, a form can include a listing of each audience member. The user can record whether the actions of the particular audience member are matching the proper answer. For example, if the instruction block informs the audience to jump for hard vowels and squat for soft vowels, the physical movement of the students in reaction to the content of the lesson block can be recorded in real time.

The recorded information from the user's assessment for each student can be transmitted to a location associated with the student such as to a parent or guardian. For example, the student is identified on the real time digital assessment form. The assessment input is associated with the student. An address, such as email of SMS address, can be associated with the student and can be associated to a parent, guardian or other care taker. The filled in real time assessment form can then be electronically transmitted to the address. This provide the ability for the parent, guardian or other care taker to receive real time updates on the progress of the student without having to wait on the report card or other means for receiving information.

Once the lesson packet has been displayed and the classroom portion completed, a physical worksheet can be provided to the student that contains instructions and practice program that are created according to the lesson criteria and lesson packet. Therefore, the student can be provided with feedback for the educational content in a physical form that is also consistent with the material of the lesson packet.

In one embodiment, the first lesson block can include visual and audio information to provide educational content. For example, the lesson can initially display blocks at the left side of the screen. The blocks can then be moved to the right side of the screen one at a time with audio information counting the blocks as they are moved. The audience has previously been instructed to count along with the audio information and to perform a physical activity while counting. A second lesson block can have only the visual display of the blocks moving from the left side of the screen to the right side allowing the student to count without the audio cues to reinforce the lesson.

In one embodiment the lesson block is less than 10 minutes long. Therefore, the lesson block does not display in excess of the average attention span of the audience. It has been reported that attention span of the first grader ranges from 6 to 20 minutes with the average being 14.5 minutes for males and 10.5 for females.

In one embodiment, the user has login information including a electronic address. The electronic address can be an email. The real time digital assessment form can be transmitted to the electronic address of the user once the lesson packet is created. The real time digital assessment form can be transmitted to a portable computing device of the user so that the user can fill in the assessment tool while also moving about the class room. The real time digital assessment form can be transmitted to the user wirelessly. The filled real time digital assessment form can be transmitted to a remote computer device associated with the audience member such as a smart phone, PDA and the like.

Figure 4:
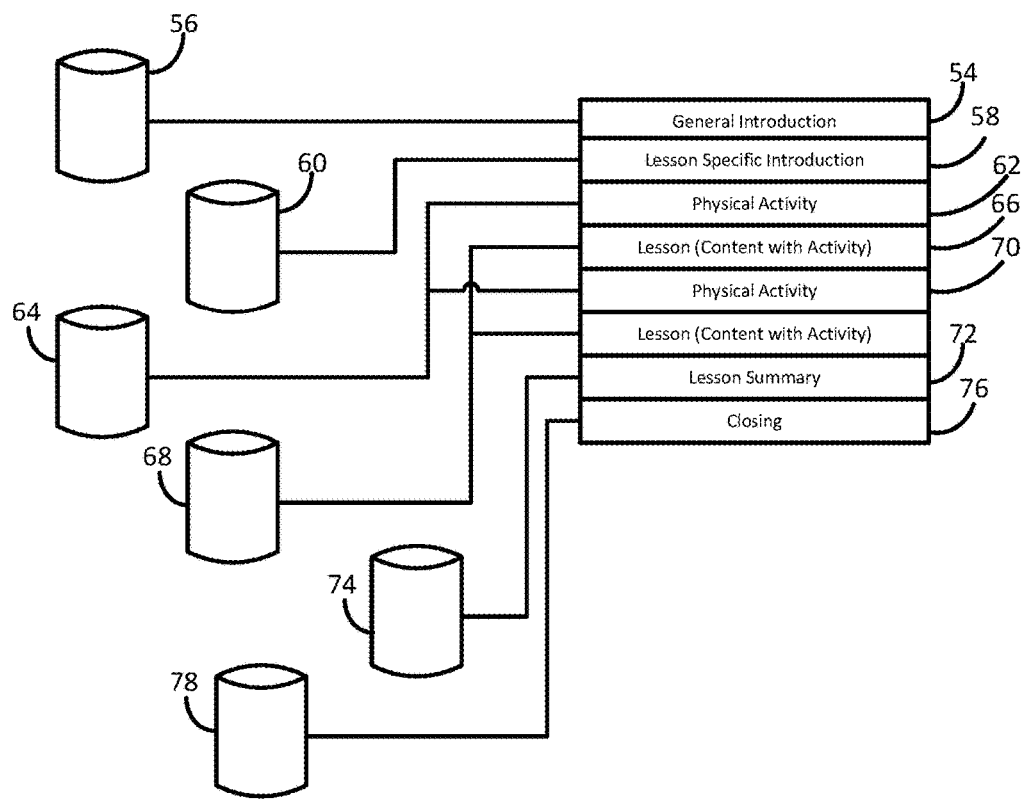
FIG. 4 is a diagram of the invention.
Figure 5:
FIG. 5 is an illustration of one assess form of the invention.
Figure 6:
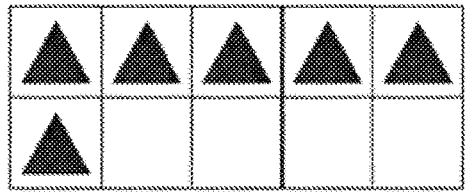
FIG. 6 is an illustration of a worksheet form of the invention; and,
FIG. 7 is a diagram of aspects of the invention.
Figure 6:
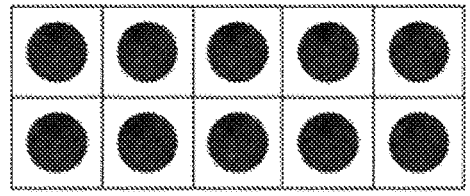
Figure 6:
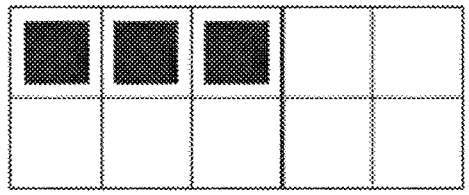
Figure 6:
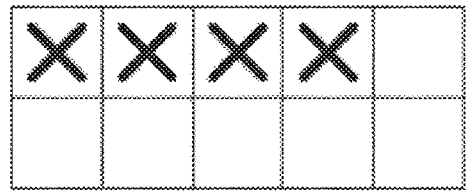
Figure 6:
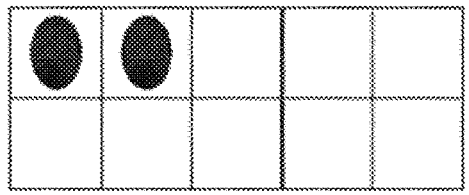
Figure 6:
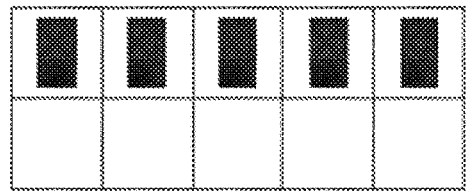

Referring to FIG. 4, the computer readable instructions begin by assembling several packets that form the lesson starting with the general introduction packet 54. The general introduction packet includes an avatar that is selected from a group of avatars stored in general information database 56. The database includes the audio and video files associated with the general introduction. The general introduction packet can also be associated with a particular avatar. Audio information can include speech, lyrics, music, and any combination. In one embodiment, there is a male and a female avatar that is randomly selected when the general introduction is created. Once the computer readable instructions select the avatar, the avatar can be static through the remainder of the created lesson.

Based upon the class and standard selected by the teacher, the lesson specific introduction packet 58 is created. The content from the lesson specific introduction packet is retrieved from the lesson specific introduction database 60. The lesson specific introduction packet is designed to provide a high-level outline of the specific lesson that has been selected by the teacher. In one embodiment, the lesson specific introduction packet can include several components. A first component can be relating the lesson to a virtual location. For example, the avatar can convey to the students that the lesson (coined Walkabout) would be in the city. The second component would be to provide the content for the introduction such as conveying that the lesson involves adding and subtracting and will use picture and actions. The first physical activity packet 62 can be included in the lesson. The physical activity packet instructs the student to perform a physical activity such as hiking or stomping to initiate physical movement or the students. The activity is taken from the physical activity database 64. A first lesson packet 66 can then be retrieved from the lesson database 68. The lesson packet can include a first component that is instructions associating a physical movement with the lesson. For example, the avatar can instruct the students to twist when a particular image is displayed. The second component can include a display of items related to the lesson and an inquiry made to the students. For example, the image of three polygons can be display with the "+" sign with four polygons and the students inquired as to the total number of polygons. The students can be reminded to perform the physical activity for each object viewed, seven in this case. After a predetermined period of time, the answer is given such as "the sum of three plus four is seven". In one embodiment, the lesson can include sequences. A sequence is a series of instructions, tasks, and answers related to the lesson subject. A sequence can include the steps of (i) count the pictures, (ii) predetermined pause, (iii) recitation of the problem, and the (iv) answer can be repeated for several different equations, on one example. After a predetermined number of sequences, a physical activity 70 can be introduced to separate sequences. A second lesson can be presented that is also in the lesson. For example, the second lesson can be subtraction wherein the first lesson could be addition. For example, when the student is asked to view images to subtract, the student can be instructed to draw a diagonal line across their body with their arm representing the number of the images to subtract. When the second lesson is completed, a lesson summary 72 is included which summarizes the skills taught during the lesson. The lesson summary can be taken from the lesson summary database 74. For example, the avatar can state that the lesson included addition and subtraction and restate the rules and process for performing these skills. The lesson can be concluded with a closing 76 where the avatar provides a gratitude and parting message. The closing can be taken from the closing database 78.

In one embodiment, the first and second lesson specific instruction packet, and the lesson summary are associated with the selected content so that there is consistency in the lesson between these components. The first and second lessons can be based upon the content selected by the teacher to provide consistency.

Unless specifically stated, terms, and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

The teacher can also be given access to worksheets under the Worksheet selection 82 that complement the lessons generated. For example, if the teacher creates a lesson based upon a certain standard, worksheets for that standard can be accessed and printed and provided to the students to reinforce the lesson learned. When lessons are created, the lessons can be named and can be placed organized as "My Favorites". The list of lessons stored in the "My Favorites" can then be retrieved and played. From the "My Favorites" selection, the created lesson can be added to a playlist. Playlists can be created under selection 86. When a playlist is created, the lesson or multiple lessons can be added to the playlist as well as a description, teams, and students. Lessons can be added to the play list from the list of lessons previously created or from the "My Favorites" list.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A computerized system for creating and delivering audio, textual and visual content with real-time assessments for kinesthetic learning comprising:
    a server having a computer readable medium and in communications with a classroom computer;
    a set of server computer readable instructions stored on the computer readable medium configured to:
    receive lesson criteria from the classroom computer;
    select a set of action blocks according to the lesson criteria wherein each action block includes a kinesthetic content block consistent with the set of action blocks;
    select an instruction block according to the lesson criteria that is consistent with the set of action blocks;
    create a first lesson block by appending the instruction block to the set of action blocks;
    create a second lesson block from the set of action blocks;
    display the first lesson block and the second lesson block to multiple students on a multi-viewer display; and,
    provide a physical worksheet to a student having content consistent with the lesson criteria.

2. The computerized system of claim 1 wherein:
    the classroom computer is configured to display a real-time digital assessment form to the classroom computer for recording a first student's performance in response to displaying the first lesson block and the second lesson block on the classroom computer; and,
    the set of server computer readable instructions is configured to receive real-time assessment information from the classroom computer according to the real-time digital assessment form.

3. The computerized system of claim 2 wherein the set of server computer readable instructions is configured to transmit the real-time digital assessment form and each student's real-time assessment information electronically upon completion to a guardian of each student of the multiple students having assessment information.

4. The computerized system of claim 1 wherein the first lesson block includes visual and audio content according to the lesson criteria and the second lesson block includes visual content according to the lesson criteria and the first lesson block.

5. The computerized system of claim 1 wherein the set of server computer readable instructions is configured to create a lesson packet by storing the first lesson block and the second lesson block and each student's real-time assessment information in the computer readable medium indexed by a lesson label.

6. The computerized system of claim 1 wherein the first lesson block includes content for kinesthetic, visual and auditory styles of learning.

7. The computerized system of claim 1 wherein the set of action blocks, instruction block, first lesson block, and second lesson block are less than 10 minutes in length.

8. A computerized system for creating and delivering educational content for kinesthetic learning comprising:
    a server having a computer readable medium and in communications with a classroom computer and configured to:
    receive lesson criteria representing a subject and a standard;
    randomly select a set of action blocks according to the lesson criteria wherein each action block includes a kinesthetic content block consistent with the action block;
    select an instruction block according to the lesson criteria from a set of instruction blocks filtered according to the lesson criteria;
    create a first lesson block from a set of lesson blocks filtered according to the lesson criteria and having at least one action block selected from the set of action blocks;
    create a second lesson block from the set of filtered lesson blocks;
    append the first lesson block and the second lesson block to a lesson packet;
    display the lesson packet to multiple students simultaneously;

provide a real-time digital assessment form to the classroom computer for completion by an educator during display of the lesson packet; and, receive a real-time assessment information from the classroom computer according to the real-time digital assessment form.

9. The computerized system of claim 8 wherein the server is configured to transmit the real-time digital assessment form and each student's real-time assessment information to guardians of each student respectively so that guardians can receive real-time performance assessments prior to a student leaving an educational institution.

10. The computerized system of claim 8 wherein the server is configured to provide a portable computing device to the educator; and, provide the real-time digital assessment form to the educator by transmitting the real-time digital assessment form to the portable computing device.

11. The computerized system of claim 8 wherein the first lesson block includes audio and visual content requesting a physical motion from a student according to one or more action block.

12. The computerized system of claim 11 wherein the second lesson block includes visual content according to the first lesson block and the one or more action block.

13. The computerized system of claim 8 wherein the server is configured to digitally transmit a physical worksheet associated with a student to a guardian of the student.

14. The computerized system of claim 8 wherein the first lesson block includes an association of physical activity with the educational content.

15. The computerized system of claim 8 wherein the server and classroom computer are configured to:
   display an avatar;
   animate the avatar according to one or more action blocks; and,
   associate a physical movement request according to the one or more action blocks.

16. A computerized system for creating educational content with real-time assessments for kinesthetic learning comprising:
   a server having a computer readable medium and in communications with a classroom computer configured to:
   receive a lesson criterion from the classroom computer having a subject and a standard;
   select an action block from a set of action blocks according to the lesson criteria wherein the action block includes a kinesthetic content block consistent with the action block;
   select an instruction block according to the lesson criteria and action block;
   provide a real-time digital assessment form to the classroom computer;
   display the action block and instruction block to a student; and,
   receive real-time digital assessment information from the classroom computer.

17. The computerized system of claim 16 wherein the server is configured to transmit the real-time digital assessment information to a guardian of the student.

18. The computerized system of claim 16 wherein the server is configured to transmit the real-time digital assessment form to a portable computing device in wireless communication with the server configured to allow the classroom computer to receive assessment information while moving about a classroom and when the action block is being displayed to the student.

19. The computerized system of claim 16 wherein the server is configured to transmit the real-time digital assessment information to a mobile device associated with the student.

20. The computerized system of claim 16 wherein the server is configured to transmit the real-time digital assessment information to a mobile device associated a guardian associated with the student.

* * * * *